United States Patent
Verrecchia et al.

(10) Patent No.: US 12,379,042 B2
(45) Date of Patent: Aug. 5, 2025

(54) MINIATURE MEDIA ISOLATED ROCKING DIAPHRAGM VALVE WITH ENHANCED FLUX CIRCUIT

(71) Applicant: Parker-Hannifin Corporation, Cleveland, OH (US)

(72) Inventors: Joel J. Verrecchia, Hollis, NH (US); James A. Burns, Wilton, NH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/692,374

(22) PCT Filed: Sep. 8, 2022

(86) PCT No.: PCT/US2022/076100
§ 371 (c)(1),
(2) Date: Mar. 15, 2024

(87) PCT Pub. No.: WO2023/081553
PCT Pub. Date: May 11, 2023

(65) Prior Publication Data
US 2024/0376995 A1    Nov. 14, 2024

Related U.S. Application Data

(60) Provisional application No. 63/313,955, filed on Feb. 25, 2022, provisional application No. 63/275,475, filed on Nov. 4, 2021.

(51) Int. Cl.
*F16K 31/06* (2006.01)
*F16K 27/00* (2006.01)
*F16K 27/02* (2006.01)

(52) U.S. Cl.
CPC ........ *F16K 27/003* (2013.01); *F16K 27/0236* (2013.01); *F16K 27/029* (2013.01);
(Continued)

(58) Field of Classification Search
CPC .. F16K 27/003; F16K 27/029; F16K 31/0675; F16K 31/0655; F16K 31/0641; F16K 31/0624
See application file for complete search history.

(56) References Cited

U.S. PATENT DOCUMENTS 6,726,173 B2 *  4/2004  Hettinger ............ F16K 31/0641
                                              251/129.2
6,830,231 B2   12/2004  Paessler et al.
(Continued)

FOREIGN PATENT DOCUMENTS

WO      2018208851 A1   11/2018

OTHER PUBLICATIONS

International Search Report and Written Opinion issued for corresponding International Application No. PCT/US2022/076100, mailed Dec. 23, 2022.

(Continued)

*Primary Examiner* — Umashankar Venkatesan
(74) *Attorney, Agent, or Firm* — Renner, Otto, Boisselle & Sklar, LLP

(57) ABSTRACT

A magnetically operated valve includes a combined valve body and bobbin that includes a bobbin portion that supports a magnet wire coil and a valve body portion that houses a pole and an armature. The armature is moveable under magnetic forces to operate a valve operator to control the fluid flow through the valve. The valve includes a flux bracket having a first end that is positioned in close contact with the pole and a second end that is passed through the valve body portion of the combined valve body and bobbin to position the second end in proximity to the armature. The flux bracket is formed as a single piece of material, such as a single piece of stamped or otherwise formed soft iron. The valve operator may be configured as a rocker with a fluid (Continued)

isolating diaphragm, and the valve may have a three-way or a two-way valve configuration.

20 Claims, 4 Drawing Sheets

(52) U.S. Cl.
CPC ...... *F16K 31/0624* (2013.01); *F16K 31/0641* (2013.01); *F16K 31/0655* (2013.01); *F16K 31/0675* (2013.01)

(56) References Cited

U.S. PATENT DOCUMENTS

| | | | | |
|---|---|---|---|---|
| 8,104,510 B2* | 1/2012 | Ams | .................. | F16K 31/0624 |
| | | | | 137/625.44 |
| 8,453,992 B2 | 6/2013 | Palmer | | |
| 9,091,368 B2 | 7/2015 | Scheibe et al. | | |
| 9,482,360 B2 | 11/2016 | Bantz et al. | | |
| 10,119,625 B2* | 11/2018 | Ohki | ....................... | F16K 11/04 |
| 11,326,705 B2* | 5/2022 | Bühler | ................ | F16K 27/0263 |
| 11,959,563 B2* | 4/2024 | Bühler | ....................... | F16K 7/14 |
| 2010/0012869 A1* | 1/2010 | Hild | ....................... | F16K 11/04 |
| | | | | 251/129.01 |
| 2010/0043738 A1* | 2/2010 | Grandvallet | ........ | F16K 31/0641 |
| | | | | 123/90.39 |
| 2016/0010760 A1 | 1/2016 | Bantz et al. | | |
| 2018/0003317 A1* | 1/2018 | Iguchi | ....................... | F16K 1/36 |
| 2021/0048116 A1 | 2/2021 | Bühler | | |

OTHER PUBLICATIONS

International Preliminary Report on Patentability issued for corresponding International Application No. PCT/US2022/076100, mailed May 24, 2023.

* cited by examiner

MINIATURE MEDIA ISOLATED ROCKING DIAPHRAGM VALVE WITH ENHANCED FLUX CIRCUIT

This application is a national phase of International Application No. PCT/US2022/076100 filed Sep. 8, 2022, which claims priority to U.S. Provisional Patent Application No. 63/313,955 filed Feb. 25, 2022, and U.S. Provisional Patent Application No. 63/275,475 filed Nov. 4, 2021, each of which is hereby incorporated herein by reference in its entirety.

FIELD OF INVENTION

The present application relates to fluid control devices such as valves, and in particular to media isolated rocking diaphragm valves which are typically used in in-vitro diagnostic devices, analytical chemistry instruments, and other liquid handling applications.

BACKGROUND OF THE INVENTION

Conventional media isolated valves operate by magnetic forces applied via a flux circuit that includes several components. A typical valve design includes a flux bracket, a flux coupler, a magnet wire coil wound on a plastic bobbin, a pole, and an armature to form the flux circuit. There are flux losses wherever the flux path must cross a boundary between magnetic components or a gap of non-magnetic material, such as for example plastic or air. One approach to overcoming inefficiencies in the flux circuit has been to make the flux circuit components large enough to provide the requisite magnetomotive force required for a given particular application, but for many applications compact size is desirable and thus increasing component size is an undesirable approach.

In one type of valve configuration commonly referred to as a rocking diaphragm media isolated valve, such a valve uses a polymer rocker that pivots on a centrally located stainless steel pivot pin. A diaphragm isolates the flow paths for the media, typically a liquid, from other components of the valve that form the flux circuit. Such valves may be configured as a three-way valve with two valve seats arranged on opposite sides of the rocker, and three ports including two inlet ports and a common outlet port. The rocker is pivoted to permit flow from one or the other of the inlet ports through the outlet port. Other valves may be configured as a two-way valve with one valve seat on one end of the rocker and two ports including an inlet port and an outlet port, whereby the rocker is pivoted to either open or close a fluid pathway from the inlet port though the outlet port. In either configuration, the valve is actuated by an electromagnet that pulls an armature from an un-actuated position in which the armature is held away from a fixed pole by a coil spring, to an actuated position in which the armature is drawn by magnetic forces against the pole. Typically, such valves use a copper magnet wire coil wound on a plastic bobbin to induce a magnetic field, thereby magnetizing the ferritic steel components located around the coil that form the flux circuit.

As referenced above, a flux bracket component typically forms part of the magnetic flux circuit. The flux bracket typical of conventional three-way and two-way valves may be a two-piece bracket formed from metal injection molding. In such a two-piece bracket configuration, the flux bracket typically has an upper part that is metal injection molded to the pole, and to assemble the valve the upper bracket part is slid over a lower bracket part and the two halves are welded together. Alternatively, the flux bracket may be stamped and bent soft iron with the pole being press fit into the flux bracket. An additional stamped flux coupler part can then be fit and crimped into the opening in the flux bracket to complete the flux circuit. When assembled, the armature moves through a bore hole centrally located in the flux coupler. In both configurations, the valves use an actuator assembly that is self-contained and structurally separate from the fluid media by a diaphragm. Conventional configurations employing either the two-piece or stamped and bent bracket with the additional flux coupler are multi-component structures that are complex to manufacture, and have presented difficulties in reducing size to achieve a more compact overall valve configuration. The conventional configurations also have significant gaps between components that interrupt the flux circuit, which are difficult to minimize further as is desirable to maximize the magnetic force operation.

SUMMARY OF THE INVENTION

The present application provides an enhanced rocking diaphragm media isolated solenoid valve that has a compact configuration as compared to conventional configurations while maintaining effective performance. To reduce the size of a media isolated solenoid valve while still providing a sufficient magnetomotive force, higher flux circuit efficiencies are realized by minimizing gaps between components of the flux circuit. Valve configurations of the present application realize a higher flux circuit efficiency by incorporating a single piece of formed soft iron flux bracket into the valve structure. A first end of the single piece flux bracket is crimped to be in close contact with or fixed to a pole component, and a second end of the flux bracket opposite from the first end is passed through a combined valve body and bobbin component in proximity to a moving armature. This configuration creates a highly efficient and miniaturized flux circuit with minimal gaps between flux circuit components, providing enhanced efficiency when direct current is applied to a wound magnet wire coil wrapped around the bobbin portion of the combined valve body and bobbin component. A flux circuit with this configuration has been measured to have at least a 20% higher force from the electromagnet acting on the armature as compared to when the bracket does not pass through the combined valve body and bobbin component.

By configuring the flux bracket as a single piece and incorporated with respect to the pole and armature as described, the overall size of the valve assembly is miniaturized to be more compact as compared to conventional configurations. In addition, the valve assembly process is simplified because there is no connection required between the valve actuator and the valve operator. Another benefit is that the fit and alignment of the components that form the flux circuit are all positioned relative to one single part constituting the single piece flux bracket.

In exemplary embodiments, a valve includes a bottom plate with a plurality of ports and a rocker that rotates about a rocker pivot pin, the rocker engaging a diaphragm that opens and closes the ports based on the position of the rocker. The valve includes a combined valve body and bobbin component that houses the rocker. The combined valve body and bobbin component defines a tubular bore that extends along an axis that is perpendicular to the rocker, and the bore houses an armature and a pole. The armature is axially moveable within the bore relative to the pole and in a direction that is perpendicular to a surface of the rocker. The valve also includes a flux bracket that has a first end coupled or fixed to the pole member, and a second end opposite from the first end that is housed inside the combined valve body and bobbin component adjacent to the armature. A bobbin portion of the combined valve body and bobbin component supports a wound magnet wire coil, which surrounds the bore and is coupled to an electrical source. When the magnet wire coil is energized by the electrical source, a magnetic field is generated to move the armature within the bore in the axial direction to control the position of the rocker. The first end of the flux bracket may be crimped to the pole to couple or fix the first end of the flux bracket to the pole. The valve further may include a first resilient member positioned between a shoulder on the armature and the flux bracket, and the first resilient member biases the armature against the rocker. The valve further may include a second resilient member that biases the rocker oppositely from the first resilient member.

An aspect of the invention, therefore, is a valve having an enhanced flux circuit configuration to permit effective operation in a compact size with minimal gaps between components of the flux circuit. In exemplary embodiments, a valve includes a bottom plate having a plurality of fluid flow paths including at least one inlet path and an outlet path for a fluid flow through the bottom plate; a combined valve body and bobbin that is fixed to the bottom plate, the combined valve body and bobbin including a bobbin portion that supports a magnet wire coil and a valve body portion that houses a valve operator that is moveable between a first operator position and a second operator position to control the fluid flow through the bottom plate; the bobbin portion of the combined valve body and bobbin further defining a bobbin bore; a pole that is fixed within the bobbin bore; an armature positioned within the bobbin bore and adjacent to the pole, wherein by energizing the magnet wire coil the armature is moveable through the bobbin bore relative to the pole along a stroke distance from a first armature position to a second armature position to operate the valve operator to control the fluid flow through the bottom plate; and a flux bracket having a first end that is positioned in close contact with the pole and a second end that is passed through the valve body portion of the combined valve body and bobbin to position the second end in proximity to the armature. The flux bracket may be configured as a single piece of stamped material, or otherwise formed as a single piece using any suitable manufacturing process, such as for example wire EDM, waterjet cut, laser cut, metal injection molding, or machining processes and the like. The valve operator may be configured as a rocker with a fluid isolating diaphragm attached to the rocker, and the valve may have a three-way or a two-way valve configuration.

In an exemplary embodiment of the valve, the first end of the flux bracket is crimped and fixed to the pole.

In an exemplary embodiment of the valve, the pole has an external end that extends through the first end of the flux bracket, and the first end of the flux bracket extends around the external end of the pole.

In an exemplary embodiment of the valve, the second end of the flux bracket has a bent portion to permit passing the second end through the valve body portion, and second end of the flux bracket extends around the armature.

In an exemplary embodiment of the valve, the flux bracket is a single piece of integral material.

In an exemplary embodiment of the valve, the valve body portion and the bobbin portion are integrated as a single piece of molded material to form the combined valve body and bobbin.

In an exemplary embodiment of the valve, the valve further includes a first resilient member housed within the valve body portion that biases the armature toward the first armature position, whereby when the armature is in the first armature position when the magnet wire coil is de-energized the armature interacts against a first end of the valve operator to position the valve operator in the first operator position.

In an exemplary embodiment of the valve, the first resilient member is compressed between a shoulder of the armature and the second end of the flux bracket.

In an exemplary embodiment of the valve, the valve further includes a second resilient member housed within the valve body portion that biases the valve operator toward the second operator position oppositely from the first resilient member; and a force applied by the first resilient member is greater than a force applied by the second resilient member such that when armature is in the first armature position when the magnet wire coil is de-energized the armature positions the valve operator in the first operator position due to the greater force of the first resilient member, and when armature is in the second armature position when the magnet wire coil is energized the armature is spaced apart from the valve operator and the valve operator is moved to the second operator position by the force of the second resilient member.

In an exemplary embodiment of the valve, the second resilient member is compressed between an inside surface of the valve body portion and a second end of the valve operator.

In an exemplary embodiment of the valve, the first and second resilient members are coil springs.

In an exemplary embodiment of the valve, the rocker is housed within the valve body portion of the combined valve body and bobbin, and the rocker is rotatable about a pivot pin between a first rocker position corresponding to the first operator position and a second rocker position corresponding to the second operator position to control the fluid flow through the bottom plate.

In an exemplary embodiment of the valve, movement of the rocker positions the elastomeric diaphragm against a portion of the plurality of fluid flow paths to control the fluid flow through bottom plate, and wherein the diaphragm fluidly isolates the plurality of fluid flow paths from the valve body portion of the combined valve body and bobbin.

In an exemplary embodiment of the valve, the rocker is made of a polymer material and the diaphragm is overmolded onto the rocker.

In an exemplary embodiment of the valve, the diaphragm has a sealing bead positioned at or adjacent to a perimeter of the diaphragm to fluidly isolate the plurality of fluid flow paths from the valve body portion of the combined valve body and bobbin.

In an exemplary embodiment of the valve, the valve is configured as a three-way valve in which the plurality of fluid flow paths includes a first inlet path, an outlet path, and a second inlet path positioned on an opposite side of the outlet path relative to the first inlet path.

In an exemplary embodiment of the valve, when the valve operator is in the first operator position the valve operator seals the first inlet path to prevent fluid flow between the first inlet path and the outlet path, and the valve operator lifts off of the second inlet path to permit fluid flow between the second inlet path and the outlet path; and wherein when the valve operator is in the second operator position the valve operator seals the second inlet path to prevent fluid flow between the second inlet path and the outlet path, and the valve operator lifts off of the first inlet path to permit fluid flow between the first inlet path and the outlet path.

In an exemplary embodiment of the valve, the valve is configured as a two-way valve in which the plurality of fluid flow paths includes only a first fluid flow path and a second fluid flow path, with one of the first or second fluid flow paths acting as the inlet path and the other of the first or second fluid flow paths acting as the outlet path.

In an exemplary embodiment of the valve, when the valve operator is in the first operator position the valve operator seals the first fluid flow path to prevent fluid flow between the first fluid flow path and the second fluid flow path; and wherein when the valve operator is in the second operator position the valve operator lifts off of the first fluid flow path to permit fluid flow between the first fluid flow path and the second fluid flow path.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
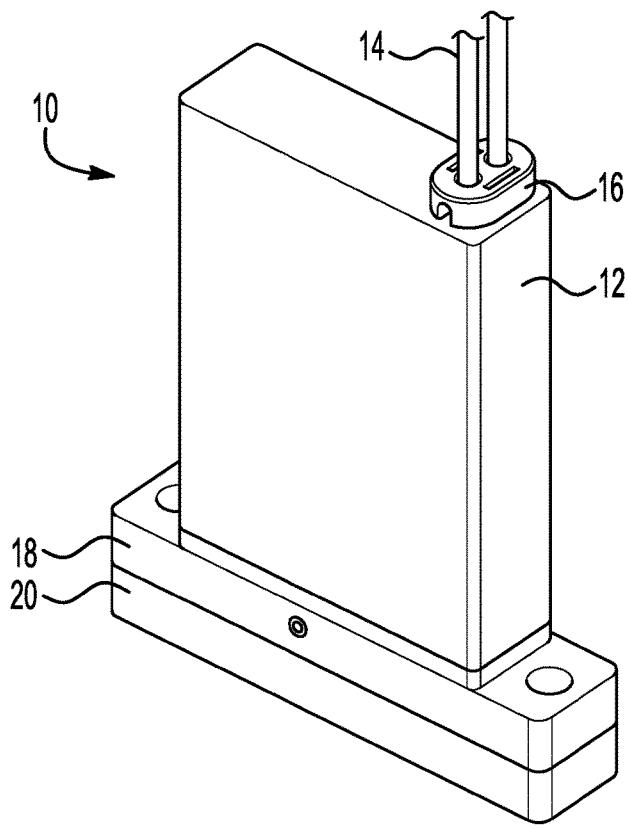
FIG. 1 is a drawing depicting a top perspective view of an exemplary embodiment of a media isolated solenoid valve.

Embodiments of the present application will now be described with reference to the drawings, wherein like reference numerals are used to refer to like elements throughout. It will be understood that the figures are not necessarily to scale.

The present application provides an enhanced media isolated solenoid valve that has a compact configuration as compared to conventional configurations while maintaining effective performance. FIG. 1 is a drawing depicting a top perspective view of an exemplary embodiment of a media isolated solenoid valve. The valve 10 includes a valve housing 12 that houses the electromagnetic actuation and operator components of the valve 10. Electrical insulated wiring 14 extends from the valve housing 10 to connect to a power source (not shown) to supply electrical current to the electromagnetic components of the valve that are housed within the valve housing. Environmental sealing is enhanced by an insulated cap 16 that is positioned on the valve housing 12 and through which the insulated wiring 14 extends. The valve housing 10 is mounted onto a combined valve body and bobbin 18, which is described in further detail below. The combined valve body and bobbin 18 is mounted and fixed oppositely from the valve housing onto a bottom plate 20. The valve housing 10, combined valve body and bobbin 18, and bottom plate 20 may be fixed to each other by using any suitable fastening mechanism, such as for example bolt or screw fastening assemblies, or ultrasonic welding or similar manufacturing process.

Figure 2:
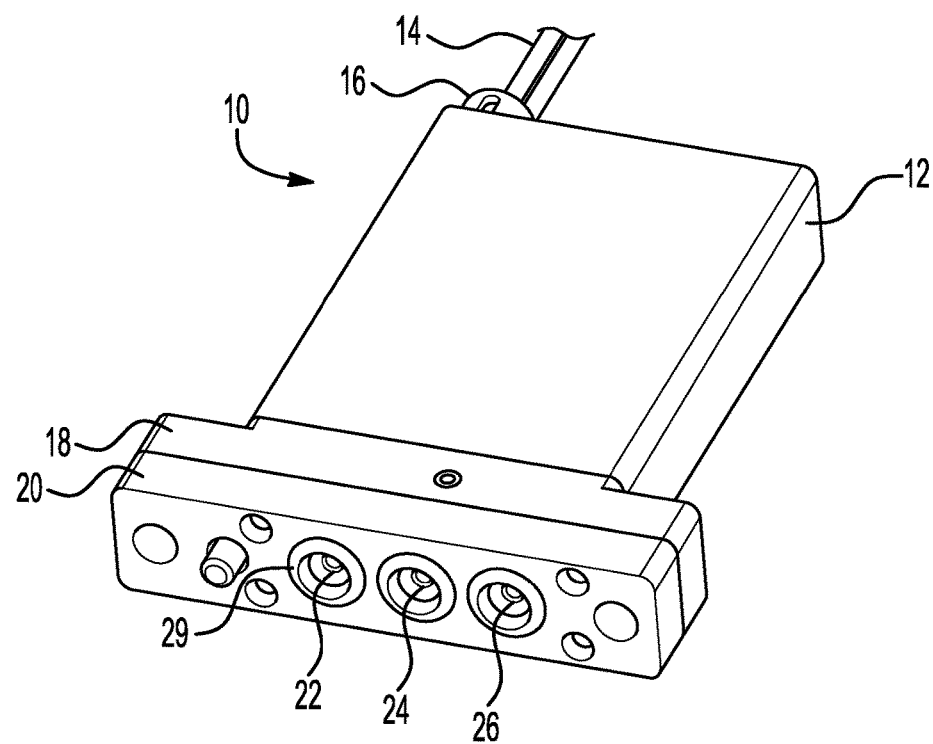
FIG. 2 is a drawing depicting a bottom perspective view of the media isolated solenoid valve of FIG. 1 showing the bottom plate and ports, illustrating a three-way valve configuration.

FIG. 2 is a drawing depicting a bottom perspective view of the media isolated solenoid valve 10 of FIG. 1 showing the bottom plate and valve ports formed into the bottom plate. The example valve 10 of FIGS. 1 and 2 has a three-way valve configuration in which a plurality of valve ports is formed into the bottom plate, and the plurality of valve ports includes a first inlet port 22, an outlet port 24, and a second inlet port 26 that is positioned on an opposite side of the outlet port relative to the first inlet port. The valve ports may be sealed by respective sealing elements 29, which for example may be O-ring seals or comparable elastomeric seals. As explained in further detail below, in a three-way valve configuration, fluid flows through either one of the first inlet port 22 or the second inlet port 26, and through the bottom plate and out of the outlet port 24. Accordingly, the valve 10 includes a valve operator that is moveable between a first operator position and a second operator position, whereby the valve operator operates by closing off or sealing the first inlet port 22 when the second inlet port 26 is open, and vice versa.

Figure 3:
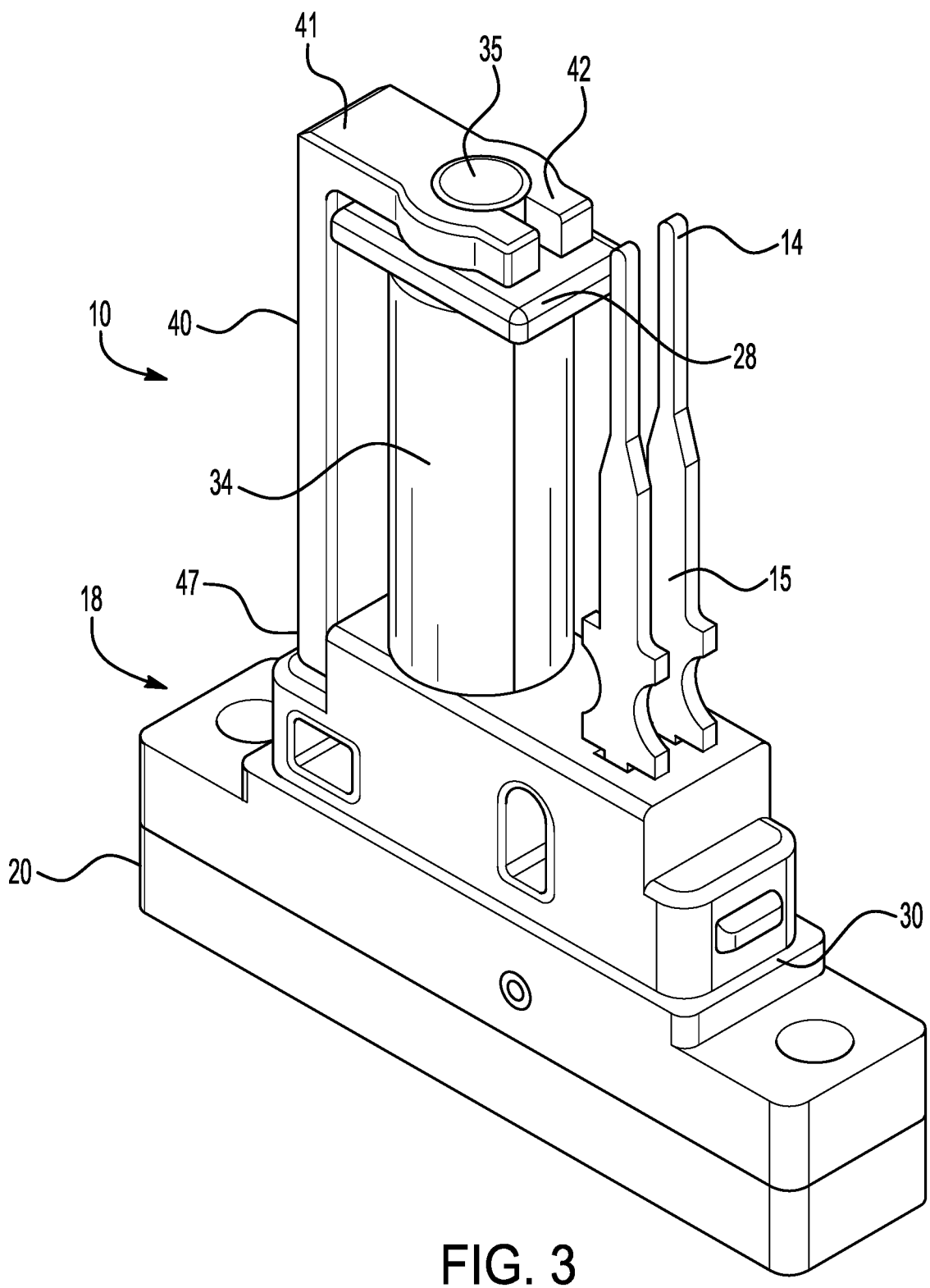
FIG. 3 is a drawing depicting a top perspective view of the media isolated solenoid valve of FIGS. 1 and 2 with the housing removed.
Figure 4:
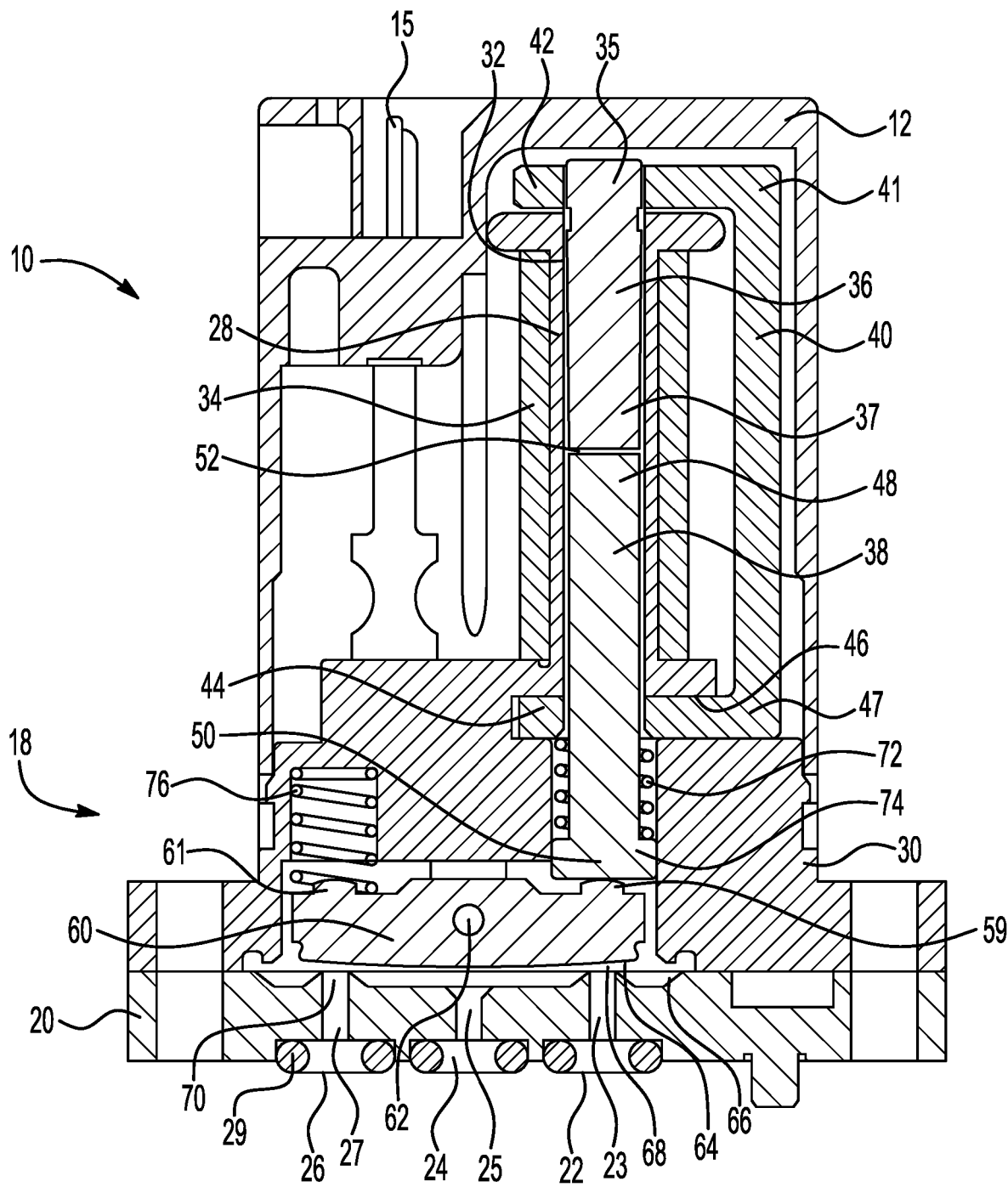
FIG. 4 is a drawing depicting a cross-sectional view the media isolated solenoid valve as depicted in FIG. 3.

FIG. 3 is a drawing depicting a top perspective view of the media isolated solenoid valve 10 of FIGS. 1 and 2 with the housing 12 removed, and FIG. 4 is a drawing depicting a cross-sectional view the media isolated solenoid valve 10 as depicted in FIG. 3. As referenced above, the combined valve body and bobbin 18 is mounted and fixed onto the bottom plate 20. The combined valve body and bobbin 18 includes a bobbin portion 28 and a valve body portion 30 that are formed integrally as a single piece. The bobbin portion 28 and the valve body portion 30 may be formed integrally as a single piece of a molded material, such as for example a molded plastic material. The bobbin portion 28 is configured as a tubular member having an outer surface and an inner surface, with the inner surface defining a bobbin bore 32. The bobbin portion 28 functions as a support structure for a magnet wire coil 34 that includes wire windings that are wound around the outer surface of the bobbin portion 28. The bobbin bore 32 of the bobbin portion 28 houses a fixed pole 36 and a moveable armature 38, the moveable armature 38 being moveable through the bobbin bore 32 of the bobbin portion 28 between a first armature position and a second armature position along a longitudinal direction through the bobbin bore 32. As described in more detail below, movement of the armature controls movement of a valve operator housed within the valve body portion 30 to control the flow of fluid through the ports of the bottom plate. The electrical wiring 14 is connected to electrical pins 15 that are electrically connected to the magnet wire coil 34. The cap 16 shown in FIGS. 1 and 2 may be snap fit over electrical connections through which the insulated wiring extends.

To reduce the size of a media isolated solenoid valve while still providing a sufficient magnetomotive force, higher flux circuit efficiencies are realized by minimizing gaps between components of the flux circuit. The configuration of valve 10 realizes a higher flux circuit efficiency by incorporating a single piece, flux bracket 40 into the valve structure. The flux bracket 40 may be configured as a single piece of integral material, such as for example a single piece of soft iron that is stamped to form such single piece, or otherwise formed as a single piece using any suitable manufacturing process, such as for example wire EDM, waterjet cut, laser cut, metal injection molding, or machining processes and the like. The single piece flux bracket 40 has a first bent portion 41 to place a first end 42 in proximity to the pole 36. The first end 42 of the single piece flux bracket 40 may be crimped to be in close contact with the pole 36, and in particular may be coupled or fixed to the pole 36 by the crimping operation. In the example configuration as depicted in FIGS. 3 and 4, an external end 35 of the pole 36 extends through the bobbin portion 28 of the combined valve body and bobbin 18, and through the first end 42 of the flux bracket 40 with such first end 42 of the flux bracket 40 extending circumferentially around the external end 35 of the pole 36. A second end 44 of the flux bracket 40 opposite from the first end 42 is passed through the valve body portion 30 of the combined valve body and bobbin 18 to be located in proximity to the moveable armature 38. In the example of FIGS. 3 and 4, the valve body portion 30 defines a body bore 46, and the single piece flux bracket 40 has a second bent portion 47 such that the second end 44 of the flux bracket 40 is passed through the body bore 46 with the second end 44 extending around the armature 38. In this manner, the single piece flux bracket 40 has a "C" shape with the first end 42 being crimped in close contact or fixed to the pole 36, and the second end 44 being positioned in proximity to the armature 38. As referenced above, the armature is moveable through the bobbin bore 32 of the bobbin portion 28 between a first armature position and a second armature position. Because the armature 38 is moveable, there is a slight gap between the armature 38 and the second end 44 of the flux bracket 40 to permit such armature movement, but this gap is minimized by passing the second end 44 through the valve body portion 30 to be in proximity to the armature 38.

The pole 36 has an internal end 37 that is opposite from the external end 35. The armature 38 has a first end 48 and a second end 50 opposite from the first end 48, with the first end 48 of the armature being positioned adjacent to the internal end 37 of the pole 36. The first end 48 of the armature and the internal end 37 of the pole 36 define a stroke distance 52 therebetween, with the stroke distance corresponding to the moveable distance of the armature 38 between the first armature position spaced apart from the pole and the second armature position essentially against the pole. Accordingly, FIG. 4 depicts the armature in the first armature position. The magnet wire coil 34 is electrically connected to the electrical terminals 15 and thus the wiring 14. When the magnet wire coil 34 is energized, a magnetic field is created that generates a magnet flux that travels through the valve components, including in particular the pole 36, flux bracket 40, and armature 38. The pole, armature, and flux bracket all are made of ferrous materials commonly used in the art of solenoid valves. The magnetic force that is generated draws the armature 38 from the armature first position spaced apart from the pole, across the stroke distance 52 and toward the fixed pole 36 to the armature second position essentially against the pole, thereby operating the valve operator component of the valve 10 as further detailed below.

As described above, the configuration of valve 10 employs a single piece flux bracket that has a first end crimped to be in close contact with or fixed to the pole, and a second end that is passed through the valve body portion of the combined valve body and bobbin to be in proximity to the moveable armature. This configuration creates a highly efficient and miniaturized flux circuit with minimal gaps between flux circuit components, providing enhanced efficiency when direct current is applied to the magnet wire coil wrapped around the bobbin portion of the combined valve body and bobbin. A flux circuit with this configuration has been measured to have at least a 20% higher force from the magnetic forces acting on the armature as compared to conventional configurations in which the flux bracket does not pass through the bobbin or valve body components. In addition, by configuring the flux bracket as a single piece and incorporated with respect to the pole and armature as described, the overall size of the valve assembly is miniaturized to be more compact as compared to conventional configurations. Furthermore, the valve assembly process is simplified because there is no connection required between the valve actuator and the valve operator, and the fit and alignment of the components that form the flux circuit are all positioned relative to one single part constituting the single piece flux bracket.

By energizing the magnet wire coil, the armature is moveable through the bobbin bore relative to the pole along the stroke distance from the first armature position to the second armature position. Movement of the armature in turn operates a valve operator to move between a first operator position and a second operator position to control the fluid flow through the bottom plate via the inlet and outlet ports. The flux circuit components of the valve 10 are particularly suitable for use in a rocker diaphragm media isolated valve configuration, in which the valve operator includes a rocker onto which there is attached an elastomeric diaphragm that seals the fluid media flow areas from the valve body portion that includes components of the flux circuit. Accordingly, movement of the rocker positions the diaphragm against a portion of the plurality of fluid flow paths to control the fluid flow through bottom plate, wherein the diaphragm fluidly isolates the plurality of fluid flow paths from the valve body portion of the combined valve body and bobbin that includes component of the flux circuit.

As depicted in the cross-sectional view of FIG. 4, the valve 10 includes a valve operator having a rocker 60 that pivots or "rocks" about a pivot pin 62 between a rocker first position and a rocker second position. The rocker first position corresponds to the first operator position referenced above, and the rocker second position corresponds to the second operator position referenced above. The rocker may be made of a polymer material that does not affect the magnetic flux, and the pivot pin may be made of any suitable rigid material such as stainless steel or a rigid plastic. The rocker 60 is housed within the valve body portion 30 of the combined valve body and bobbin 18. The valve operator further includes a diaphragm 64 made of an elastomeric material that is attached to the rocker 60. For example, the elastomeric diaphragm 64 may be over-molded onto the polymer rocker 60. The cross-sectional view of FIG. 4 also depicts the fluid flow paths through the bottom plate 20. In particular, the first inlet port 22 is in fluid communication with a first inlet path 23, the outlet port 24 is in fluid communication with an outlet path 25, and the second inlet port 26 is in fluid communication with a second inlet path 27. In the three-way valve configuration, depending upon the position of the rocker 60 of the valve operator, either of the first inlet path 23 or the second inlet path 27 is in fluid communication with the outlet path 25, with the other of the first inlet path 23 or the second inlet path 27 being sealed and closed off from the outlet path 25 by the diaphragm 64 of the valve operator.

The diaphragm 64 may include a sealing bead 66 that is molded or otherwise formed and positioned at or adjacent to a perimeter of the diaphragm 64. The sealing bead 66 is compressed between the body portion 30 of the combined valve body and bobbin 18 and the bottom plate 20. In this manner, the sealing bead 66 of the diaphragm 64 seals the fluid flow paths from the flux circuit components so that the flux circuit components are isolated from the fluid media (which for this type of valve typically is liquid). To enhance the closing of the inlet flow paths, the diaphragm 64 further may include a first sealing pad 68 for sealing and closing off the first inlet path 23, and a second sealing pad 70 for sealing and closing off the second inlet path 27.

The valve 10 further may include a first resilient member 72 that is housed within the valve body portion 30 of the combined valve body and bobbin 18. The armature 38 may include a shoulder 74 that is positioned adjacent to the armature second end 50. As shown in FIG. 4, the first resilient member 72 is compressed between the second end 44 of the of the flux bracket 40 and the shoulder 74 of the armature 38. Accordingly, the first resilient member 72 operates to bias the armature 38 toward the first armature position against a first end 59 of the rocker 60, which tends to rotate the rocker 60 in a clockwise direction about the pivot pin 62. In said first position, therefore, the armature is fully biased against the first end 59 of the rocker 60 which biases the rocker toward the rocker first position. The valve 10 further may include a second resilient member 76 that also is housed within the valve body portion 30 of the combined valve body and bobbin 18. As shown in FIG. 4, the second resilient member 76 is compressed between an inside surface of the valve body portion 30 and a second end 61 of the rocker 60 opposite from the first end 59. Accordingly, the second resilient member 76 biases the rocker toward the rocker second position opposite to the bias of the first resilient member 72 relative to rotation about the pivot pin 62, and thus the second resilient member tends to rotate the rocker 60 in a counterclockwise direction about the pivot pin 62. The first and second resilient members may be configured as coils springs. The armature is axially moveable within the bore relative to the pole and in a direction that is perpendicular to a surface of the rocker.

The rocking diaphragm valve 10 operates as follows. In exemplary embodiments, the first resilient member 72 has a greater biasing force than a biasing force of the second resilient member 76. Accordingly, when the magnet wire coil 34 is de-energized, the greater biasing force of the first resilient member 72 overcomes the lesser biasing force of the second resilient member 76. The first resilient member 72 therefore biases the armature 38 to the armature first position spaced part from the pole 36, which also rotates the rocker 60 maximally clockwise to the rocker first position. This in turn presses the diaphragm against the bottom plate 20 at the first inlet path 23, which seals and closes off the first inlet path 23 from the outlet path 25. With the rocker rotated maximally clockwise to the rocker first position, this also in turn lifts the diaphragm off from the bottom plate 20 at the second inlet path 27, which places the second inlet path 27 in fluid communication with the outlet path 25. Because this state corresponds to an initial state when the magnet wire coil is de-energized, the first inlet port 22 (first inlet path 23) is commonly referred to as a normally closed port, and the second inlet port 26 (second inlet path 27) is commonly referred to as a normally open port.

As referenced above, when the magnet wire coil 34 is energized, a magnetic field is created that generates a magnetic flux that travels through the valve components, including in particular the pole 36, flux bracket 40, and armature 38 that form the flux circuit. The magnetic force that is generated draws the armature 38 from the first armature position spaced apart from the pole 36, across the stroke distance 52 and toward the fixed pole 36 to the second armature position essentially against the pole 36. In this manner, the armature 38 is moveable in a longitudinal direction along the bobbin bore 32 relative to the pole 36 in a direction that is perpendicular to a surface of the rocker contacted by the armature. The magnetic force of the energized magnet wire coil 34 overcomes the biasing force of the first resilient member 72, and thus the armature 38 is lifted from the rocker 60 and the first end 59 of the rocker 60 is freed from the biasing force of the first resilient member 72. With the biasing force of the first resilient member 72 removed, the biasing force of the second resilient member 76 against the second end 61 of the rocker 60 is no longer opposed, and thus the biasing force of the second resilient member 76 rotates the rocker maximally counterclockwise to the rocker second position. This in turn presses the diaphragm against the bottom plate 20 at the second inlet path 27, which seals and closes off the second inlet path 27 from the outlet path 25. With the rocker rotated maximally counterclockwise to the rocker second position, this also in turn lifts the diaphragm off from the bottom plate 20 at the first inlet path 23, which places the first inlet path 23 in fluid communication with the outlet path 25. When the magnet wire coil 34 is de-energized, the greater biasing force of first resilient member 72 returns the valve 10 to the initial state described above, with the armature 38 returned to the first armature position.

Figure 5:
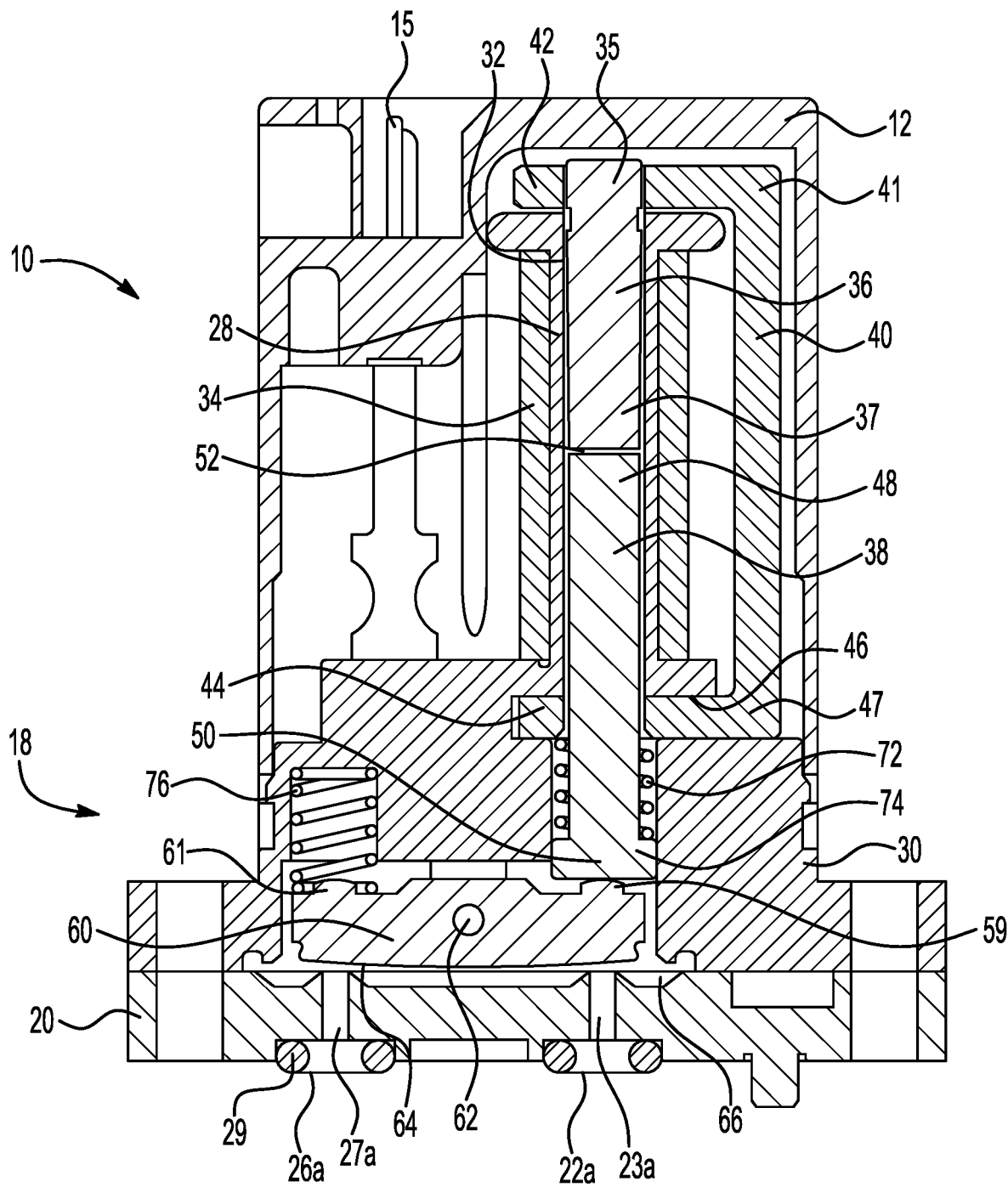
FIG. 5 is a drawing depicting a cross-sectional view of an alternative exemplary media isolated solenoid valve having a two-way valve configuration.

FIG. 5 is a drawing depicting a cross-sectional view an alternative exemplary media isolated solenoid valve 10a having a two-way valve configuration. The two-way valve 10a has components in common with the three-way valve 10 of FIGS. 1-4, and thus like components are identified with like reference numerals. In particular, the components of the flux circuit that drive the valve operator can be employed in either a two-way or three-way valve configuration. The principal difference is that in the two-way valve embodiment 10a of FIG. 5, there are only two ports—a first port 22a in fluid communication with a first fluid flow path 23a, and a second port 26a in fluid communication with a second fluid flow path 27a. The first and second fluid flow paths are joined by a connecting fluid flow path that runs along the back side of the valve body to the second port 26a. Either port may function as the inlet port or the outlet port depending on the direction of fluid flow, and the dedicated outlet port 24 and the associated outlet flow path 25 of the three-way valve configuration are omitted in the two-way valve configuration.

In other respects, the two-way valve 10a operates comparably as the three-way valve 10 of the previous embodiment. As referenced above, the first resilient member 72 has a greater biasing force than a biasing force of the second resilient member 76. Accordingly, when the magnet wire coil 34 is de-energized, the greater biasing force of the first resilient member 72 overcomes the lesser biasing force of the second resilient member 76. The first resilient member 72 therefore biases the armature 38 to the armature first position spaced apart from the pole 36, which rotates the rocker 60 maximally clockwise to the rocker first position.

This in turn presses the diaphragm against the bottom plate 20 at the first fluid flow path 23*a*, which seals and closes off the first fluid flow path 23*a*. In the two-way valve configuration, with the rocker rotated maximally clockwise to the rocker first position, this blocks any fluid flow between the first fluid flow path 23*a* and the second fluid flow path 27*a*. Because this state corresponds to an initial state when the magnet wire coil is de-energized, the two-way valve 10*a* is commonly referred to as a normally closed valve.

As referenced above, when the magnet wire coil 34 is energized, a magnetic field is created that generates a magnetic flux that travels through the valve components, including in particular the pole 36, flux bracket 40, and armature 38 that form the flux circuit. The magnetic force that is generated draws the armature 38 from the first armature position spaced apart from the pole 36, across the stroke distance 52 and toward the fixed pole 36 to the second armature position essentially against the pole 36. The magnetic force of the energized magnet wire coil 34 overcomes the biasing force of the first resilient member 72, and thus the armature 38 is lifted from the rocker 60 and the first end 59 of the rocker 60 is freed from the biasing force of the first resilient member 72. With the biasing force of the first resilient member 72 removed, the biasing force of the second resilient member 76 against the second end 61 of the rocker 60 is no longer opposed, and the biasing force of the second resilient member 76 rotates the rocker maximally counterclockwise to the rocker second position. With the rocker rotated maximally counterclockwise to the rocker second position, this in turn lifts the diaphragm off from the bottom plate 20 at the first fluid flow path 23*a*, which places the first fluid flow path 23*a* in fluid communication with the second fluid flow path 27*a*. When the magnet wire coil 34 is de-energized, the greater biasing force of first resilient member 72 returns the valve 10*a* to the initial state described above, with the armature 38 returned to the armature first position.

An aspect of the invention, therefore, is a valve having an enhanced flux circuit configuration to permit effective operation in a compact size within minimal gaps between components of the flux circuit. In exemplary embodiments, a valve includes a bottom plate having a plurality of fluid flow paths including at least one inlet path and an outlet path for a fluid flow through the bottom plate; a combined valve body and bobbin that is fixed to the bottom plate, the combined valve body and bobbin including a bobbin portion that supports a magnet wire coil and a valve body portion that houses a valve operator that is moveable between a first operator position and a second operator position to control the fluid flow through the bottom plate; the bobbin portion of the combined valve body and bobbin further defining a bobbin bore; a pole that is fixed within the bobbin bore; an armature positioned within the bobbin bore and adjacent to the pole, wherein by energizing the magnet wire coil the armature is moveable through the bobbin bore relative to the pole along a stroke distance from a first armature position to a second armature position to operate the valve operator to control the fluid flow through the bottom plate; and a flux bracket having a first end that is positioned in close contact with the pole and a second end that is passed through the valve body portion of the combined valve body and bobbin to position the second end in proximity to the armature. The valve may include one or more of the following features, either individually or in combination.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve comprising:
   a bottom plate having a plurality of fluid flow paths including at least one inlet path and an outlet path for a fluid flow through the bottom plate;
   a combined valve body and bobbin that is fixed to the bottom plate, the combined valve body and bobbin including a bobbin portion that supports a magnet wire coil and a valve body portion that houses a valve operator that is moveable between a first operator position and a second operator position to control the fluid flow through the bottom plate, wherein the bobbin portion and the valve portion of the combined valve body and bobbin are formed integrally as a single piece;
   the bobbin portion of the combined valve body and bobbin further defining a bobbin bore;
   a pole that is fixed within the bobbin bore;
   an armature positioned within the bobbin bore and adjacent to the pole, wherein by energizing the magnet wire coil the armature is moveable through the bobbin bore relative to the pole along a stroke distance from a first armature position to a second armature position to operate the valve operator to control the fluid flow through the bottom plate; and
   a flux bracket having a first end that is positioned in close contact with the pole and a second end that is passed through the valve body portion of the combined valve body and bobbin to position the second end in proximity to the armature.

2. The valve of claim 1, wherein the first end of the flux bracket is crimped and fixed to the pole.

3. The valve of claim 1, wherein the pole has an external end that extends through the first end of the flux bracket, and the first end of the flux bracket extends around the external end of the pole.

4. The valve of claim 1, wherein the second end of the flux bracket has a bent portion to permit passing the second end through the valve body portion, and second end of the flux bracket extends around the armature.

5. The valve of claim 1, wherein the flux bracket is a single piece of integral material.

6. The valve of claim 1, wherein the flux bracket is a single piece of soft iron formed by one of stamping, wire EDM, waterjet cut, laser cut, metal injection molding, or machining processes.

7. The valve of claim 1, wherein the valve body portion and the bobbin portion are integrated as a single piece of molded material to form the combined valve body and bobbin.

8. The valve of claim 1, further comprising a first resilient member housed within the valve body portion that biases the armature toward the first armature position, whereby when the armature is in the first armature position when the magnet wire coil is de-energized the armature interacts against a first end of the valve operator to position the valve operator in the first operator position.

9. The valve of claim 8, wherein the first resilient member is compressed between a shoulder of the armature and the second end of the flux bracket.

10. The valve of claim 8, further comprising a second resilient member housed within the valve body portion that biases the valve operator toward the second operator position oppositely from the first resilient member; and
a force applied by the first resilient member is greater than a force applied by the second resilient member such that when armature is in the first armature position when the magnet wire coil is de-energized the armature positions the valve operator in the first operator position due to the greater force of the first resilient member, and when armature is in the second armature position when the magnet wire coil is energized the armature is spaced apart from the valve operator and the valve operator is moved to the second operator position by the force of the second resilient member.

11. The valve of claim 10, wherein the second resilient member is compressed between an inside surface of the valve body portion and a second end of the valve operator.

12. The valve of claim 8, wherein the first and second resilient members are coil springs.

13. The valve of claim 1, wherein the valve operator comprises a rocker that is housed within the valve body portion of the combined valve body and bobbin, and the rocker is rotatable about a pivot pin between a first rocker position corresponding to the first operator position and a second rocker position corresponding to the second operator position to control the fluid flow through the bottom plate.

14. The valve of claim 13, wherein the valve operator further comprises an elastomeric diaphragm attached to the rocker, wherein movement of the rocker positions the diaphragm against a portion of the plurality of fluid flow paths to control the fluid flow through bottom plate, and wherein the diaphragm fluidly isolates the plurality of fluid flow paths from the valve body portion of the combined valve body and bobbin.

15. The valve of claim 14, wherein the rocker is made of a polymer material and the diaphragm is over-molded onto the rocker.

16. The valve of claim 14, wherein the diaphragm has a sealing bead positioned at or adjacent to a perimeter of the diaphragm to fluidly isolate the plurality of fluid flow paths from the valve body portion of the combined valve body and bobbin.

17. The valve of claim 1, wherein the valve is configured as a three-way valve in which the plurality of fluid flow paths includes a first inlet path, an outlet path, and a second inlet path positioned on an opposite side of the outlet path relative to the first inlet path.

18. The valve of claim 17, wherein when the valve operator is in the first operator position the valve operator seals the first inlet path to prevent fluid flow between the first inlet path and the outlet path, and the valve operator lifts off of the second inlet path to permit fluid flow between the second inlet path and the outlet path; and
wherein when the valve operator is in the second operator position the valve operator seals the second inlet path to prevent fluid flow between the second inlet path and the outlet path, and the valve operator lifts off of the first inlet path to permit fluid flow between the first inlet path and the outlet path.

19. The valve of claim 1, wherein the valve is configured as a two-way valve in which the plurality of fluid flow paths includes only a first fluid flow path and a second fluid flow path, with one of the first or second fluid flow paths acting as the inlet path and the other of the first or second fluid flow paths acting as the outlet path.

20. The valve of claim 19, wherein when the valve operator is in the first operator position the valve operator seals the first fluid flow path to prevent fluid flow between the first fluid flow path and the second fluid flow path; and
wherein when the valve operator is in the second operator position the valve operator lifts off of the first fluid flow path to permit fluid flow between the first fluid flow path and the second fluid flow path.

* * * * *